United States Patent [19]

Tanaka et al.

[11] 4,366,185

[45] Dec. 28, 1982

[54] METAL-RESIN COMPOSITE AND PROCESS FOR ITS PRODUCTION

[75] Inventors: Atsuo Tanaka, Tokuyama; Takaaki Okamura, Yanai; Katsumi Kanda; Yoshikazu Kondo, both of Kudamatsu, all of Japan

[73] Assignee: Toyo Kohan Co., Ltd., Tokyo, Japan

[21] Appl. No.: 182,002

[22] Filed: Aug. 28, 1980

[30] Foreign Application Priority Data

Feb. 12, 1980 [JP] Japan .................................. 55-14816

[51] Int. Cl.$^3$ ........................... B05D 5/00; B05D 7/14
[52] U.S. Cl. ................................. 427/386; 427/388.2; 427/388.4; 427/388.5; 427/405; 427/406; 427/409; 427/410; 428/418; 428/458; 428/460; 428/461
[58] Field of Search ............... 428/457, 329, 330, 328, 428/323, 334, 460–462, 418; 427/388.1, 386, 388.2, 388.4, 388.5, 388.6, 409, 410, 405, 406; 106/14.44, 14.11, 14.41

[56] References Cited

U.S. PATENT DOCUMENTS

| | | | |
|---|---|---|---|
| 3,093,493 | 6/1963 | von Freyhold | 106/14.44 |
| 3,207,611 | 9/1965 | Ehren | 106/14.44 |
| 3,869,293 | 3/1975 | Brumbaugh | 428/330 |
| 4,103,050 | 7/1978 | Laskin et al. | 428/425.8 |
| 4,110,117 | 8/1978 | McLeod | 106/14.44 |
| 4,122,055 | 10/1978 | Tugukuni et al. | 428/418 |
| 4,229,495 | 10/1980 | Takahashi et al. | 106/14.44 |

FOREIGN PATENT DOCUMENTS 51-86529  7/1976  Japan .
53-108836 9/1978  Japan .

*Primary Examiner*—Paul J. Thibodeau
*Attorney, Agent, or Firm*—Wenderoth, Lind & Ponack

[57] ABSTRACT

Process of producing metal-resin composite, and the composite resulting therefrom, are provided. The process comprises providing a solution or dispersion of a resin, for example, an epoxy resin, said solution or dispersion having dispersed therein at least one particulate metal compound for example, an oxide, of the Group I A and II A metals of the Periodic Table, the amount of metal compound being 1–500 parts by weight per 100 parts by weight of resin, then coating the solution or dispersion on a metal substrate and heating the coated substrate to evaporate the solvent for the resin and cure the resin. The resultant metal-resin composite is corrosion resistant, especially under acidic conditions, since the resin layer having the Group I A or II A metal compound dispersed therein serves to control the pH on the surface of the metal substrate to within the range from 4 to 12 under acidic conditions in the atmosphere surrounding the metal-resin composite.

14 Claims, No Drawings

METAL-RESIN COMPOSITE AND PROCESS FOR ITS PRODUCTION

BACKGROUND OF THE INVENTION

The present invention relates to a metal-resin composite having excellent corrosion resistance, and to a process of producing the metal-resin composite.

As employed in the specification and claims, the term "metal-resin composite" means a metal article, on one or more surfaces of which is present one or more adherent, cured resin layers.

In accordance with the present invention, the resin layer or layers on the surface of the metal article is of a nature such that the metal article exhibits excellent corrosion resistance, in particular, under acidic conditions.

There have been many investigations carried out for the purpose of imparting corrosion resistance to metal articles. Despite this, means for establishing excellent corrosion resistance for metal articles have not yet been achieved, at least as concerns present day corrosive conditions.

Zinc coated steel sheets have been widely used in building materials intended for outdoor exposure, for example, in erecting roofs, walls, etc. Tin plates have been widely used as materials for forming cans. Similarly, metals such as chromium, nickel, copper and aluminum have been widely used in the field of processed goods, such as foods.

Recently, however, the price of all of these metals has risen remarkably, due to a shortage of the metals. Further, stable supplies for some of the metals have been difficult.

Under these circumstances, there have been changes from using a heavy coating weight of metals, to using a low coating weight of metals. In the field of zinc coated steel sheets, electrogalvanized steel sheets have been widely used instead of galvanized steel sheets prepared by a hot-dip process. Similarly, in forming cans from tin plates, less tin is being used in coating steel sheets, and furthermore, the use of tin free steel, instead of tin plate, has increased remarkably, because of the rising price of tin.

The use of lower coating weights for the coating metals has increased the significance of chemically treating the metal to be coated. Many studies have been carried out involving chemical treatment to improve the corrosion resistance of a metal substrate having a low coating weight of metal coated thereon, but at present, the corrosion resistance of metal substrates having a low coating weight of metal coated thereon is still poor in comparison with metal substrates having a heavy coating weight of metal coated thereon.

Metal substrates coated with a paint have also been widely used when high corrosion resistance is required. In the case where the coating weight of the coating metal is low, the role of the paint film in providing corrosion resistance is of course an important one, and many studies concerning paint films have been carried out in recent years. For example, hard paint films have been employed in order to decrease the permeation of corrosive substances through the paint film. However, the extent of the corrosion resistance provided to the metal substrate by paint films is not yet sufficient, in view of the presently existing corrosive conditions.

SUMMARY OF THE INVENTION

The object of the present invention is to provide corrosion resistance to metal articles.

This object is accomplished by the use of compounds of metals of Groups I A and II A of the Periodic Table. These metal compounds are added to a resin solution or dispersion, and the resultant mixture is then coated on the metal article, after which the solvent used in preparing the resin solution or dispersion is evaporated, and the resin is cured. The resin layer thus formed, having the metal compound dispersed therein, is extremely effective in controlling the extent of corrosion under the resin layer, particularly under acidic conditions in the corrosive atmosphere surrounding the metal article having the resin layer thereon.

More particularly, the present invention provides a process of producing a metal-resin composite, which comprises providing a solution or dispersion of at least one resin, said solution or dispersion having dispersed therein at least one particulate metal compound of the Group I A and II A metals, coating said solution or dispersion having said metal compound dispersed therein, on a metal substrate, and heating the thus coated substrate at a temperature and for a time sufficient to evaporate the solvent for said resin and cure said resin, thus producing a resin layer adhering to said metal substrate.

The present invention also provides a metal-resin composite comprising a metal article and an adherent layer of at least one cured resin, said resin having dispersed therein at least one particulate metal compound of the Group I A and Group II A metals.

DETAILED DESCRIPTION OF THE INVENTION

The resins which can be employed in the present invention are selected from the group consisting of epoxy resins, phenolic resins, acrylic resins, polyamide resins, alkyd resins, melamine resins, urea-formaldehyde resins, polybutadiene resins, polyester resins, silicone resins, polyolefin resins, urethane resins and polystyrene resins. Any of such resins can be employed in the present invention, i.e. all of such resins will be effective in producing the desired results of providing corrosion resistance to the metal substrate.

Any organic solvent, or water, can be used to prepare the resin solution or dispersion, for example, aromatic hydrocarbons, chlorinated hydrocarbons, phenols, alcohols, esters, ketones and ethers.

The resin employed in the present invention has a direct effect upon the corrosion resistance of the metal substrate, and plays an important role as a binder for the metal compound employed.

The metal compounds which can be employed in the present invention are selected from the group consisting of oxides, hydroxides, carbonates, acid carbonates, borates, perborates, phosphates, acid phosphates, silicates, aluminates, stannates, tungstates, molybdates, chromates, manganates, permanganates and carboxylates of the Group I A and Group II A metals. Examples of these metals are lithium, sodium and potassium from Group I A metal, and magnesium and calcium from Group II A metal.

The amount of the metal compound used in the present invention is 1–500 parts by weight, preferably 10–200 parts by weight, per 100 parts by weight of the resin. When the amount of metal compound is less than 1 part by weight, corrosion resistance will not be achieved. On the other hand, when the amount of metal compound is more than 500 parts by weight, it becomes extremely difficult to coat the resin solution or dispersion on the metal substrate.

Preferably, the particle size of the metal compound is less than 10 μm. When the particle size is greater than 10 μm, pinholes will develop in the resin layer, resulting in decreased corrosion resistance.

In accordance with another aspect of the present invention, even higher corrosion resistance can be imparted to the metal substrate when the solution or dispersion of the resin further contains, in addition to the metal compound of the Group I A or II A metal, at least one particulate metal selected from the group consisting of aluminum, chromium, zinc, tin, nickel, cobalt and manganese, or an alloy thereof, dispersed in the resin solution or dispersion. The particle size of these metals or alloys is preferably less than 10 μm, for the same reason given above in connection with the particle size of the Group I A and II A metal compounds. Preferably, these metals or alloys are micaceous in shape. The amount of these metals or alloys added to the resin solution or dispersion is 1–500 parts by weight, preferably 10–200 parts by weight, per 100 parts by weight of the resin.

As an alternative to incorporating the metal or alloy directly in the resin solution or dispersion containing the Group I A or II A metal compound, a separate solution or dispersion of the resin, having the metal of alloy dispersed therein, can be coated on the surface of the metal substrate, or on the surface of the resin layer containing the Group I A or II A metal compound. The resins employed in preparing this separate solution or dispersion are also selected from the group of resins described above in connection with the resin solution or dispersion containing the Group I A or II A metal compounds. Similarly, when this separate solution or dispersion is employed, the amount of the metal or alloy dispersed therein is still 1–500 parts by weight, preferably 10–200 parts by weight, per 100 parts by weight of the resin in this separate solution.

If the separate solution or dispersion, containing the metal or alloy dispersed therein, is applied to the metal substrate, the thus pre-coated substrate is heated at a temperature and for a time sufficient to evaporate the solvent for the resin and cure the resin, thus producing a pre-coated substrate which is then treated with the resin solution or dispersion containing the Group I A or II A metal compound. On the other hand, if the resin solution or dispersion containing the Group I A or II A metal compound is first applied to the metal substrate, it is heated to evaporate the solvent and cure the resin before applying the separate solution or dispersion containing the metal or alloy.

Furthermore, if iron pick-up (from the metal substrate) is undesirable, an organic resin, such as one or more of those discussed above, may be coated on the surface of the above metal-resin composite.

In any event, as each resin solution or dispersion is coated on the metal substrate, the coated substrate is heated to evaporate the solvent for the resin and cure the resin, thus producing a resin layer adhering to the metal substrate, before the next resin solution or dispersion is applied.

Additives may be incorporated in the resin solutions or dispersions in order to assist in dissolving or dispersing the resin. Additionally, pigments, plasticizers, antistatic agents, and heat- and light-stabilizers may be added to the resin solutions or dispersions.

An ordinary mixing roll and agitator may be used to uniformly disperse the Group I A or II A metal compounds, the metal or alloys, and the additives, in the resin solution or dispersion.

Any metal substrate may be treated in accordance with the present invention, including a cold reduced steel sheet, a metal previously coated with tin, chromium, zinc, nickel, copper, iron, cobalt, manganese, lead, aluminum, or an alloy thereof, or a steel previously treated with chromate, dichromate, phosphate, acid phosphate, molybdate, silicate, borate, perborate, manganate, permanganate or aluminate. Furthermore, the metal substrate need not be flat, but can be of a shaped structure.

For coating the resin solution or dispersion on the metal substrate, any means can be employed, for example, roll-coating, dipping, spray-coating, electrodeposition, etc. The particular means employed can be readily determined by the art-skilled on the basis of the condition of the resin solution or dispersion and the shape of the metal substrate.

As indicated above, after the resin solution or dispersion is applied to the metal substrate, the thus coated substrate is heated at a temperature and for a time sufficient to evaporate the solvent used in preparing the resin solution of dispersion, and to cure the resin. Any heating means may be employed, for example, hot air drying, infrared heating, high-frequency heating, etc. The particular means employed can be readily determined by the art-skilled on the basis of the condition of the resin solution or dispersion. This is also the case with respect to the temperature and duration of heating.

The metal-resin composite produced in accordance with the present invention exhibits excellent corrosion resistance. However, if still greater corrosion resistance is desired, for example, in forming cans, then it is of course possible to add another resin layer as the outermost layer of the metal-resin composite. Any resin can be employed for this purpose, such as resins discussed above, and they may be used in the form of a solution, dispersion, paste, powder, pellets or films.

The thickness of the resin layer formed from the resin solution or dispersion containing the Group I A or II A metal compound is preferably 0.5–500 μm. When its thickness is less than 0.5 μm, the corrosion resistance rapidly deteriorates. On the other hand, coatability of the resin solution or dispersion becomes difficult when attempting to obtain a resin layer having a thickness of greater than 500 μm.

The thickness of each of the other resin layers discussed above can also be selected from the range of 0.5–500 μm.

The most important point to be recognized in practicing the present invention is that the materials and their amounts are selected so that the pH of a corrosive solution which permeates through the resin layer or layers to the surface of the metal substrate is controlled to be within the range of from 4 to 12. Almost all metals have poor corrosion resistance in the case where the pH on the metal substrate surface is less than 4. On the other hand, if the pH is greater than 12, the resin layer or layers will be damaged.

The use of the above-specified compounds of the Group I A and II A metals in the indicated amount serve to control the pH on the surface of the metal substrate to within the range of from 4 to 12 under acidic conditions in the atmosphere surrounding the metal-resin composite, and a passive film becomes easily formed on the surface of the metal substrate under neutral or alkaline conditions. This is responsible for the success of the present invention in achieving corrosion resistance for the metal substrate.

The present invention will be further illustrated by the following examples, which are not intended to limit the scope of the invention.

EXAMPLE 1

An electrogalvanized steel sheet having a thickness of 0.5 mm (zinc coating weight on each side: 10 g/m$^2$) was treated with a dichromate solution, to plate 30 mg/m$^2$ chromium on each side.

The following resin solution was prepared:
Butadiene type resin solution: 100 parts by weight
  (Electron: electrodeposition paint—Kansai Paint Co., Ltd; solid percent: 15%)
Magnesium oxide: 15 parts by weight
  (particle size: under 5 μm)

The electrogalvanized steel sheet was electrodeposited with the resin solution, to obtain an electrogalvanized steel sheet in which the thickness of the resin layer was 10 μm. (Bath temperature: 25° C., voltage: 200 V, time: 3 minutes) Water was evaporated from the resin film by heat treatment at 180° C. for 10 minutes, and the resin film was thus completely cured.

The steel sheet with the resin layer had excellent formability, and the resin layer was not peeled off from the base steel, nor did any cracks occur in the resin layer, even if it was formed to 6 mm by an Erichsem test machine.

After the steel sheet with the resin layer thereon was cut cross-wise with a razor, it was tested by the salt spray test machine authorized by JIS Z 2371. In this test, red rust did not appear at the cross-hatched section, even after 400 hours had passed.

The pH on the steel sheet surface was measured, removing the resin layer after the salt spray test. The pH on the steel surface was 10.2.

On the other hand, in the case that the resin solution without magnesium oxide was used, red rust slightly appears at the cross-hatched section at about 100 hours, and appeared remarkably at the cross-hatched section after 200 hours had passed.

EXAMPLE 2

A steel pipe having a cross-sectional area of 15 A, authorized by JIS G 3442, was rinsed with water.
The following resin solution was prepared:
Acrylic type resin solution: 100 parts by weight
  (Aron S 4020: water-soluble type paint—Toa Gosei Co., Ltd.; solid percent: 30%)
Sodium aluminate: 60 parts by weight
  (particle size: under 8 μm)

Both sides of the steel pipe were coated by using a process of dipping the pipe in the resin solution, to obtain a steel pipe in which the thickness of the resin layer was 10 μm. Water was evaporated from the resin film by heat treatment at 180° C. for 10 minutes, and the resin film was thus completely cured.

The resin layer had excellent adhesive strength to the steel pipe. An attempt was made to peel the layer from the base metal with an adhesion tape, but the resin layer was not removed from the base metal.

The metal-resin composite was tested by the salt spray test machine authorized by JIS Z 2371. In this test, red rust did not appear at the cross-hatched section, even after 400 hours had passed.

The pH on the steel pipe was measured, removing the resin layer after the salt spray test. The pH on the steel pipe surface was 11.4.

On the other hand, in the case that the resin solution without sodium aluminate was used, red rust slightly appears at the cross-hatched section at about 100 hours, and appeared remarkably at the cross-hatched section after 200 hours had passed.

EXAMPLE 3

Tin free steel (TFS) consisting of metallic chromium and hydrated chromium oxide, having a thickness of 0.32 mm, was coated by the following resin solutions:
Inner resin layer:
  Phenol-epoxy type resin solution: 100 parts by weight
    (SJ-6256: solvent-type paint—Kansai Paint Co., Ltd.; solid percent: 30%)
  Magnesium hydroxide: 5 parts by weight
    (particle size: under 8 μm)
  Micaceous aluminum: 30 parts by weight
    (thickness: under 5 μm)
Outer resin layer:
  Phenol-epoxy type resin solution
    (SJ-6252: solvent type paint—Kansai Paint Co., Ltd.; solid percent: 30%)

The tin free steel sheet was coated with the resin solution for the inner layer by using a roll coater machine, to obtain a tin free steel sheet in which the thickness of the resin layer was 5 μm. Then, organic solvents were evaporated from the resin film by heat treatment at 200° C. for 10 minutes.

Next, as the outer resin layer, the resin solution was coated on the above coated steel sheet, by using a roll coater machine, so as to result in a total film thickness of 10 μm. Organic solvents were evaporated from the resin film by heat treatment at 200° C. for 10 minutes. Both resin layers were completely cured.

The steel sheet with the composite resin layers thereon was deeply drawn to form a cup at a draw ratio of 2.0 (composite resin layers: inside of cup), and 1% citric acid solution was packed in the cup and left standing for 10 days at 55° C. The composite resin layers did not peel off from the base steel, and no degradation of the composite resin layers occurred, and so iron pick-up was not recognized in the 1% citric acid solution.

The pH on the steel surface was measured, removing the composite resin layers after the cup test. The pH on the steel surface was 8.9.

On the other hand, in the case that the resin solution for the inner layer did not contain magnesium hydroxide or aluminum, iron pick-up was 12 ppm in the above cup test.

EXAMPLE 4

A cold reduced steel sheet having the thickness of 0.5 mm was electrolytically degreased in a solution of sodium hydroxide and then pickled in dilute sulfuric acid.
The following resin solutions were prepared:
Inner resin layer:
  Polyester tape resin solution: 100 parts by weight
    (Vylon 20 S: solvent-type paint—Toyo Bo Co., Ltd.; solid percent: 30%)
  Micaceous tin: 5 parts by weight
    (particle size: under 10 μm)
Outer resin layer:
  Polyester type resin solution: 100 parts by weight (Vylon 20 S: solvent-type paint—Toyo Bo Co., Ltd.; solid percent: 30%)
Calcium hydroxide: 20 parts by weight (particle size: under 5 μm)

The steel sheet was coated with the resin solution for the inner layer by using a roll coater machine, to obtain a steel sheet in which the thickness of the resin layer was 5 μm. Organic solvents were evaporated from the resin film by heat treatment at 180° C. for 10 minutes.

Next, as the outer resin layer, the resin solution was coated on the above coated steel sheet, by using a roll coater machine, so as to result in a total film thickness of 10 μm. Organic solvents were evaporated from the resin film by heat treatment at 180° C. for 10 minutes. Both resin layers were completely cured.

Then, a polyester film having a thickness of 16 μm (trade name: Lumilar, Toray Co., Ltd.) was laminated on the above steel sheet by an ordinary laminator roll.

The laminated steel sheet was quenched after heat treatment at 200° C. for one minute, to obtain good adhesion strength.

The steel sheet with the composite resin layers thereon was deeply drawn to form a cup at a draw ratio of 2.0 (composite resin layers: inside of cup), and vinegar was packed in the cup, and left standing for 10 days at 55° C. The composite resin layers did not peel off from the base steel, and no degradation of the composite resin layers occurred, and so iron pick-up was not recognized in the vinegar at all.

The pH on the steel surface was measured, removing the composite resin film layers after the cup test. The pH on the steel surface was 9.6.

On the other hand, in the case that the resin solutions for the inner and outer layers did not contain tin or calcium hydroxide, respectively, the corrosion resistance was remarkably poor. In this case, rust and loss of adhesion of the film layers were recognized at the whole parts of the cup in the above cup test.

We claim:

1. A process of producing a metal-resin composite, capable of controlling the pH of a solution, which permeates through the resin to the metal, to within the range of from 4 to 12, comprises
   providing a first solution or dispersion of at least one resin selected from the group consisting of epoxy resins, phenolic resins, acrylic resins, polyamide resins, alkyd resins, melamine resins, urea-formaldehyde resins, polybutadiene resins, polyester resins, silicone resins, polyolefin resins, urethane resins and polystyrene resins, said first solution or dispersion having dispersed therein at least one particulate metal compound selected from the group consisting of oxides, hydroxides, carbonates, acid carbonates, borates, perborates, phosphates, acid phosphates, silicates, aluminates, stannates, tungstates, molybdates, chromates, manganates, permanganates and carboxylates of Group I A and Group II A metals of the Periodic Table, the amount of said metal compound in said first solution or dispersion being 1–500 parts by weight per 100 parts by weight of said resin,
   coating said first solution or dispersion, having said metal compound dispersed therein, on a metal substrate,
   heating the thus coated substrate at a temperature and for a time sufficient to evaporate the solvent for said resin and cure said resin, thus producing a first resin layer adhering to said metal substrate,
   coating the surface of said first resin layer with a second solution or dispersion of said resin having dispersed therein at least one particulate metal selected from the group consisting of aluminum, chromium, zinc, tin, nickel, cobalt and manganese, or an alloy thereof, in an amount of 1–500 parts by weight per 100 parts by weight of said resin, and
   heating the thus coated resin layer at a temperature and for a time sufficient to evaporate the solvent for said resin and cure said resin, thus producing a second resin layer adhering to said first resin layer.

2. A process according to claim 1, wherein the amount of said metal compound is 10–200 parts by weight per 100 parts by weight of said resin in said first solution or dispersion.

3. A process according to claim 1, wherein said first solution or dispersion further contains, dispersed therein, at least one particulate metal selected from the group consisting of aluminum, chromium, zinc, tin, nickel, cobalt and manganese, or an alloy thereof, in an amount of 1–500 parts by weight per 100 parts by weight of said resin in said first solution or dispersion.

4. A process according to claim 3, wherein the amount of said metal or alloy is 10–200 parts by weight per 100 parts by weight of said resin in said first solution or dispersion.

5. A process according to claim 3, wherein the particle size of said metal or alloy in said first solution or dispersion is less than 10 μm.

6. A process according to claim 1, wherein the particle size of said metal compound is less than 10 μm.

7. A process according to claim 1, wherein the thickness of said first resin layer is 0.5–500 μm.

8. A process according to claim 1, wherein the amount of said metal or alloy is 10–200 parts by weight per 100 parts by weight of said resin in said second solution or dispersion.

9. A process according to claim 1, wherein the particle size of said metal or alloy in said second solution or dispersion is less than 10 μm.

10. A process of producing a metal-resin composite, capable of controlling the pH of a solution, which permeates through the resin to the metal, to within the range of from 4 to 12, which comprises
    providing a first solution or dispersion of at least one resin selected from the group consisting of epoxy resins, phenolic resins, acrylic resins, polyamide resins, alkyd resins, melamine resins, urea-formaldehyde resins, polybutadiene resins, polyester resins, silicone resins, polyolefin resins, urethane resins and polystyrene resins, said first solution or dispersion having dispersed therein at least one particulate metal selected from the group consisting of aluminum, chromium, zinc, tin, nickel, cobalt and manganese, or an alloy thereof, in an amount of 1–500 parts by weight per 100 parts by weight of said resin,
    coating said first solution or dispersion on a metal substrate,
    heating the thus coated substrate at a temperature and for a time sufficient to evaporate the solvent for said resin and cure said resin, thus producing a resin layer adhering to said metal substrate,
    coating the surface of said resin layer with a second solution or dispersion of said resin having dispersed therein at least one particulate metal compound selected from the group consisting of oxides, hydroxides, carbonates, acid carbonates, borates, perborates, phosphates, acid phosphates, silicates, aluminates, stannates, tungstates, molybdates, chromates, manganates, permanganates and carboxylates of Group I A and Group II A metals of the Periodic Table, the amount of said metal compound in said second solution or dispersion being 1–500 parts by weight per 100 parts by weight of said resin, and heating the thus coated substrate at a temperature and for a time sufficient to evaporate the solvent for said resin and cure said resin.

11. A process according to claim 10, wherein the amount of said metal or alloy is 10–200 parts by weight per 100 parts by weight of said resin in said first solution or dispersion.

12. A process according to claim 10, wherein the particle size of said metal or alloy in said first solution or dispersion is less than 10 μm.

13. A process according to claim 1 or 10, wherein said metal substrate is (1) a cold reduced steel sheet, (2) a metal previously coated with tin, chromium, zinc, nickel, copper, iron, cobalt, manganese, lead, aluminum, or an alloy thereof, or (3) a steel sheet previously treated with chromate, dichromate, phosphate, acid phosphate, molybdate, silicate, borate, perborate, manganate, permanganate or aluminate.

14. A process according to claim 1 or 10, wherein said metal substrate is a shaped metal structure.

* * * * *